United States Patent [19]

Person

[11] Patent Number: 4,993,881
[45] Date of Patent: Feb. 19, 1991

[54] ARRANGEMENT FOR THE TRANSPORT OF GOODS IN BULK

[76] Inventor: Sven-Johan Person, Surbrunnsgatan 4, S-532 00 Skara, Sweden

[21] Appl. No.: 263,798
[86] PCT No.: SE88/00092
§ 371 Date: Oct. 21, 1988
§ 102(e) Date: Oct. 21, 1988
[87] PCT Pub. No.: WO88/06560
PCT Pub. Date: Mar. 2, 1988
[22] PCT Filed: Mar. 2, 1988

[30] Foreign Application Priority Data

Mar. 4, 1987 [SE] Sweden ............... 8700896

[51] Int. Cl.⁵ .............................. B65G 69/08
[52] U.S. Cl. ............................. 406/88; 406/86
[58] Field of Search ............. 406/88, 86, 89, 90, 406/91

[56] References Cited

U.S. PATENT DOCUMENTS 3,610,696 10/1971 Fulton .................... 406/88
3,999,806 12/1976 Hurd ...................... 406/88

FOREIGN PATENT DOCUMENTS 1497264 4/1967 France .................. 406/88

Primary Examiner—Joseph F. Peters, Jr.
Assistant Examiner—Anne E. Bidwell
Attorney, Agent, or Firm—Dvorak and Traub

[57] ABSTRACT

An arrangement for the transport of goods in bulk, such as cereal grain, by air flowing through a perforated base plate. The arrangements are provided in areas of the base plate (1) adjacent to the perforations (7) to impart to the air flowing through at that point a movement component running along the base plate (1), where a minimum quantity of air is required in order to transport the desired quantity of goods in bulk. The perforations (7) consist of elongated slots running across the direction of flow, that is to say the direction of feed. The slots are laterally displaced in relation to the slots in front of and behind them in an unsymmetrical manner, such that they form diagonal rows (B:C), the angles ($\alpha$:$\beta$) of which to the direction of transport (A) are considerably smaller in one lateral direction than in the other, when measured from one of the slots.

5 Claims, 5 Drawing Sheets

ARRANGEMENT FOR THE TRANSPORT OF GOODS IN BULK

The present invention relates to an arrangement for the transport of goods in bulk, such as cereal grain, by means of air flowing through a perforated base plate, in conjunction with which arrangements are provided in areas of the base plate adjacent to the perforations to impart to the air flowing through at that point a movement component running along the base plate.

Such arrangements are often used in conjunction with grain silos, where the aforementioned base plate forms the bottom of the silo on which the cereal grain is supported, and arranged beneath this base plate is the space to which air is supplied via appropriate fan arrangements. Even if there is no actual need to cause the cereal grain to be fed out, air can be caused to pass via the perforations in the base plate and up through the material for the purpose of drying it.

Such an arrangement can, of course, conceivably also be applied in conjunction with other materials in bulk.

The principal object of the invention is to make available an arrangement of the kind mentioned above, in which the effective feeding out of the bulk material in question is achieved with a minimum need for a quantity of air to flow through.

This object is achieved with the present invention by causing the flow openings to be positioned in relation to one another in such a way that their number, and accordingly the combined flow area, can be reduced to a minimum, without the feeding ability of the currents of air being impaired in a negative fashion. This object is achieved with an arrangement of the kind indicated above, which is characterized in that the perforations consist of elongated slots running across the direction of flow, that is to say the direction of feed, which slots are laterally displaced in relation to the slots in front of and behind them in an unsymmetrical manner, such that they form diagonal rows, the angle of which to the direction of transport is considerably smaller in one lateral direction than in the other, when measured from one of the slots.

The following is a description of an unlimited example of the invention with reference to the accompanying drawings, in which.

Figure 1:
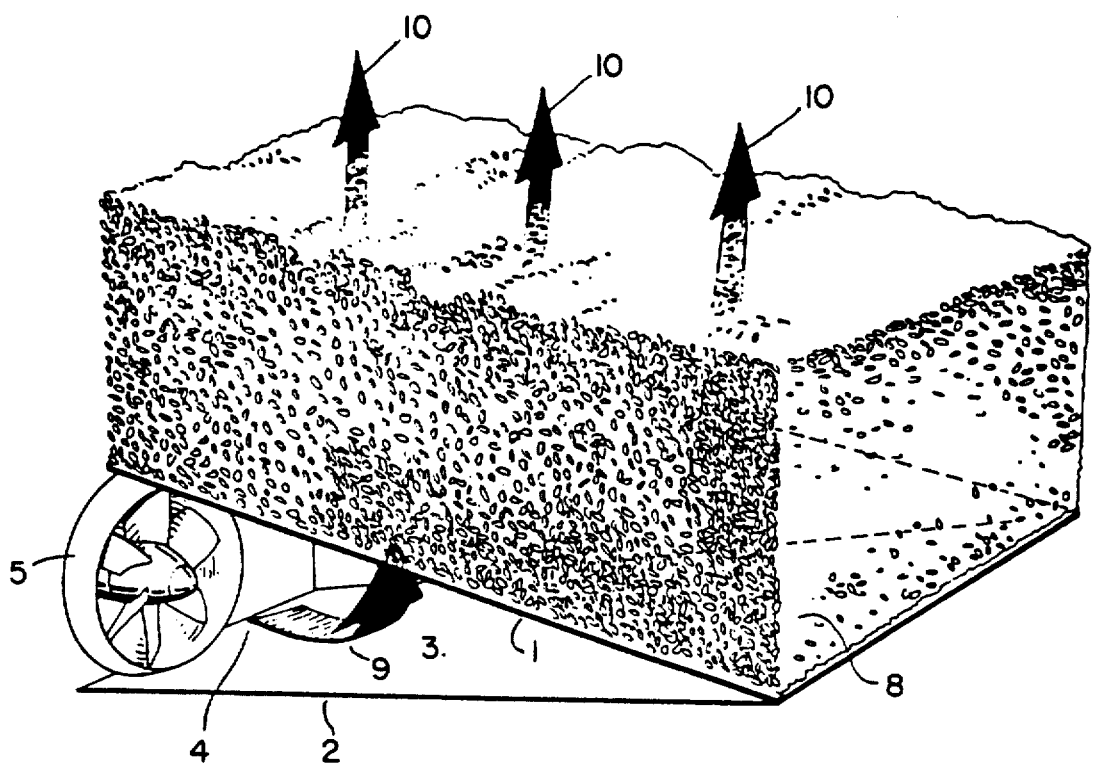
FIG. 1 illustrates in section a part of the bottom of a cereal grain silo, to which the present invention is applied, prior to the start of feeding.
Figure 7:
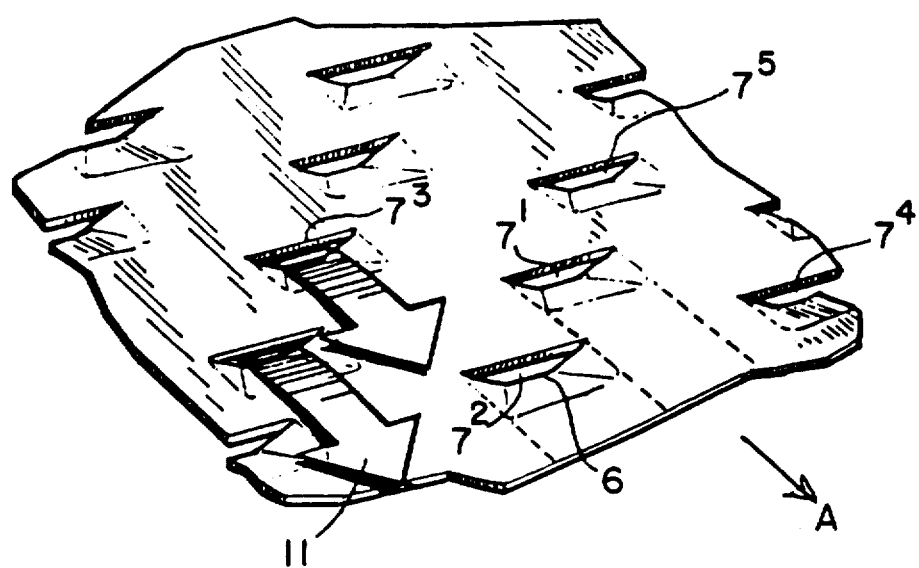
FIG. 7 illustrates a part of the slotted base plate, in conjunction with which the direction of flow of the air is marked.

FIG. 1 shows a section through the bottom part of a cereal grain storage bin. The bin consists of a base plate 1, which is shown in the Figure to be inclined slightly downwards to the right, where it meets the floor 2 of the bin. Formed between the base plate 1 and the floor 2 is a space 3, which is enclosed by means of a rear wall 4 in which a fan is arranged. As will be appreciated most clearly from FIG. 7, the base plate is perforated by a number of stamped-down areas 6, which along one edge form a slot 7 which is appropriately so adapted in width as to prevent the bulk material in question from falling through it. The cereal grain storage bin itself, the side walls of which are not shown in the drawings, since their positioning is not critical to the invention, can extend horizontally for any distance, without departing from the idea of invention. The drawings accordingly only show a section of the body 8 of cereal grain present on the base plate 1. The body 8 of cereal grain is shown in FIG. 1 to rise to a considerable height above the whole of the base plate 1, and the arrangement is being used for drying the cereal grain. Air is forced for this purpose by the fan unit 5 into the space 3 beneath the base plate 1, and moves in the direction of the arrows 9 and 10 up through the cereal grain, in so doing carrying away moisture from it.

Figure 2:
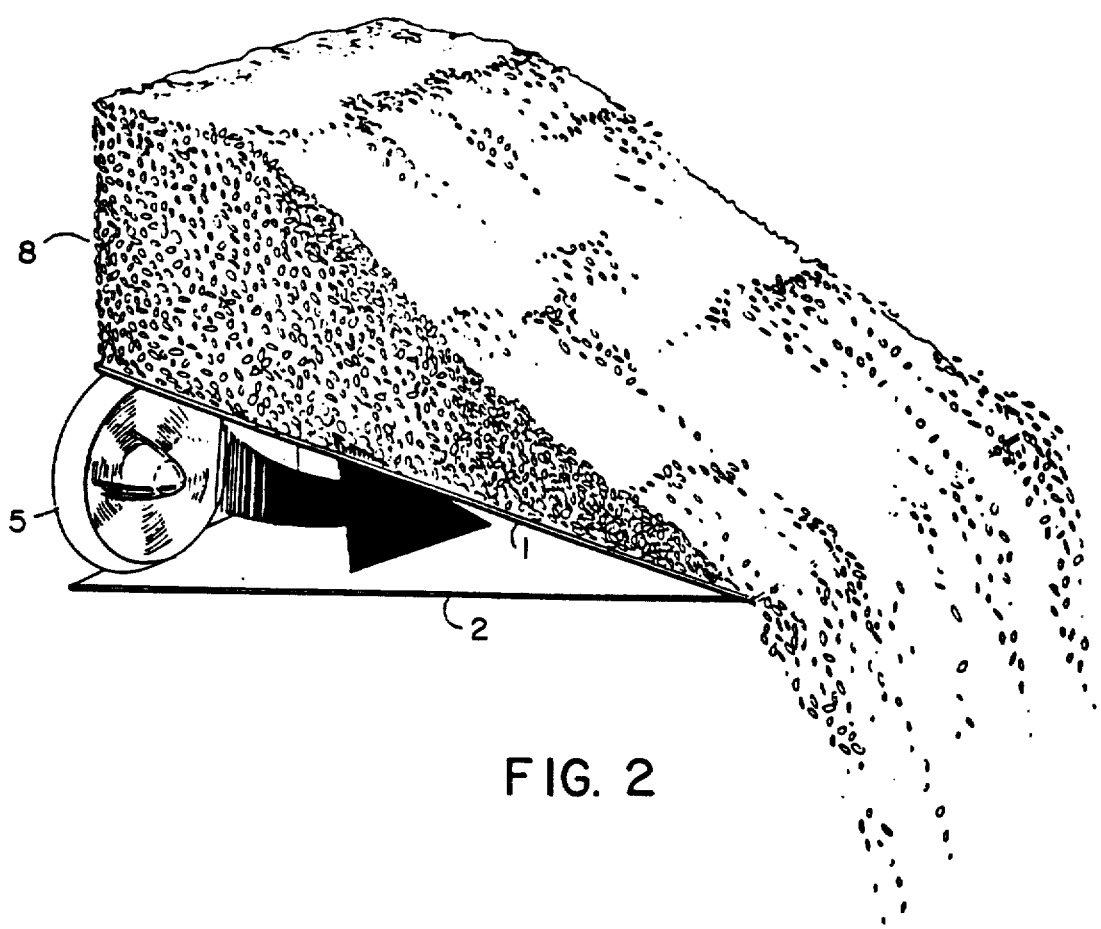
FIG. 2 illustrates a subsequent stage for the same bottom part of a cereal grain silo, during the feeding-out of cereal grain.
Figure 3:
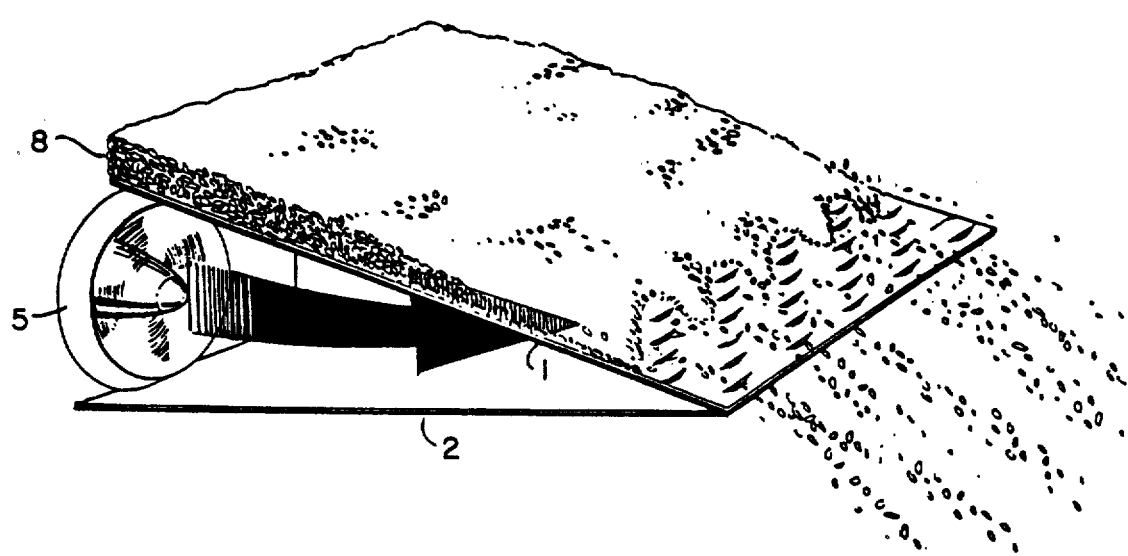
FIG. 3 illustrates a later stage during feeding-out.

When emptying is to take place, the cereal grain storage bin is opened on one side, as illustrated schematically in FIG. 2, in conjunction with which the cereal grain situated closes: to this opening pours out. In order for the feeding-out of the cereal grain to continue, including after the angle of repose of the cereal grain has been reached, the fan unit 5 is caused to force air through the slots 7 whilst the cereal grain bin is open on one side. Thanks to the presence of the funnel-shaped depression 6, which, in a backward sense in relation to the direction of feeding, is transformed into the air flow slot 7 in each of the air flow openings in the base plate, the air flow on the top side of the plate assumes the direction marked with the arrows 11 in FIG. 7, that is to say the air flows are imparted with a movement component, the direction of which is along the base plate 1. Cereal grain which is lying in the boundary zone of the exposed openings successively assumes a sweeping movement along the base plate 1 in this way. This means that any cereal grain which drops down, and which reaches exposed openings 7, will be supported by a cushion of air situated immediately adjacent to the base plate 1, which cushion of air is moving towards the discharge opening of the bin. This will continue, provided that the fan 5 is operating and the side opening of the cereal grain bin is open, for as long as any grain remains inside the bin. It is thus possible to achieve complete emptying without manual intervention. Instead of feeding out through a side opening, the removal of the cereal grain can naturally take place elsewhere, for example at the centre of the bin. In this case the slots 7 must face towards the point of removal, in accordance with the above.

Previously disclosed base plates of the kind in question, in which cereal grain is fed forwards by means of an air flow, have called for comparatively large volumes of air to flow through them. More often than not in this context, the air slots were positioned symmetrically in relation to one another, and were situated comparatively close to one another, that is to say the position of the individual slots was symmetrical in relation to the slots in front of and behind them, measured transversely to the direction of feed in both directions. What has emerged, however, in connection with the positioning of the slots, as may be appreciated most clearly from FIGS. 4-7, is that a very effective material feed is achieved from a comparatively small number of slots, which at the same time means that a comparatively moderate quantity of air needs to pass through the base plate 1 in order for the desired transported quantity of cereal grain to be capable of being achieved. The perforations 7 consist of elongated slots extending transversely accross the direction of flow A (see FIG. 6), that is to say the direction of feed, which slots are laterally displaced in an unsymmetrical manner in relation to the slots in front of and behind them, such that they form diagonal rows B; C, the angles $\alpha$; $\beta$ of which to the direction of transport are considerably smaller in one lateral direction $\alpha$ than in the other $\beta$, when measured from one of the slots. The angle $\alpha$ may appropriately be about 30°, whereas the angle $\beta$ may be about 60°. Although this choice of angles has been found to function extremely well, it is, of course, conceivable for the angles to differ somewhat without departing from the idea of invention. In the case of the majority of individual slots $7^1$, pairs of slots $7^2$, $7^3$; $7^4$, $7^5$ are situated to either side in the direction of transport A, each of which consists of one slot situated in front of, and one slot situated behind the first-mentioned slot, in which the front slot $7^2$ of one of the pairs of slots and the rear slot $7^5$ of the other pair of slots, when measured across the direction of transport A, lie slightly overlapping, or are at least displaced by a small lateral distance from their respective ends of the first-mentioned slot $7^1$, whereas the other slot $7^3$; $7^4$ in each of the two pairs of slots, measured in the same direction, is situated at a considerable distance from same slot $7^1$. In the illustrative example described here, the slots extend along lines running transverseley across the direction of transport.

Figure 4:
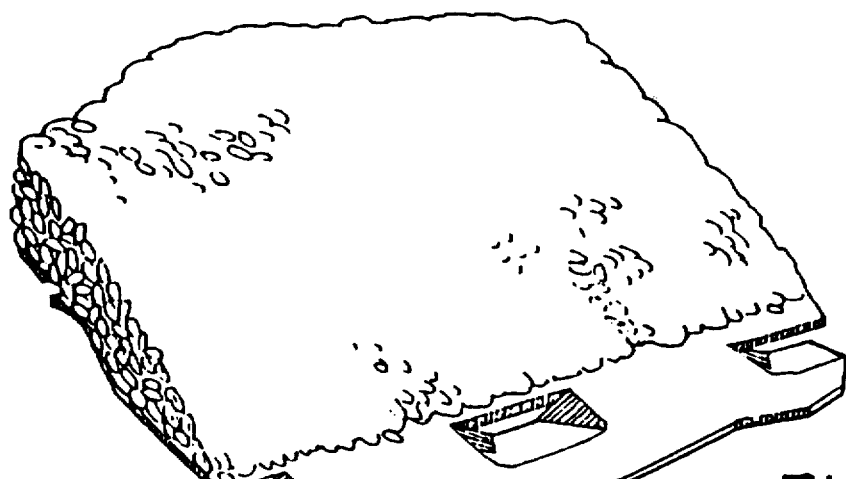
FIGS. 4, 5 and 6 illustrate on an enlarged scale the manner in which the cereal grain arranges itself around the discharge openings which are exposed little by little during feeding-out.
Figure 5:
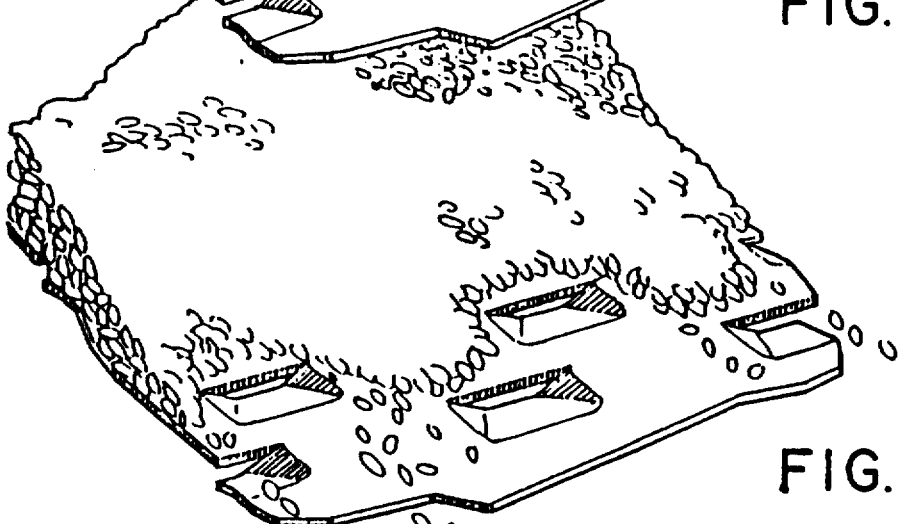
Figure 6:
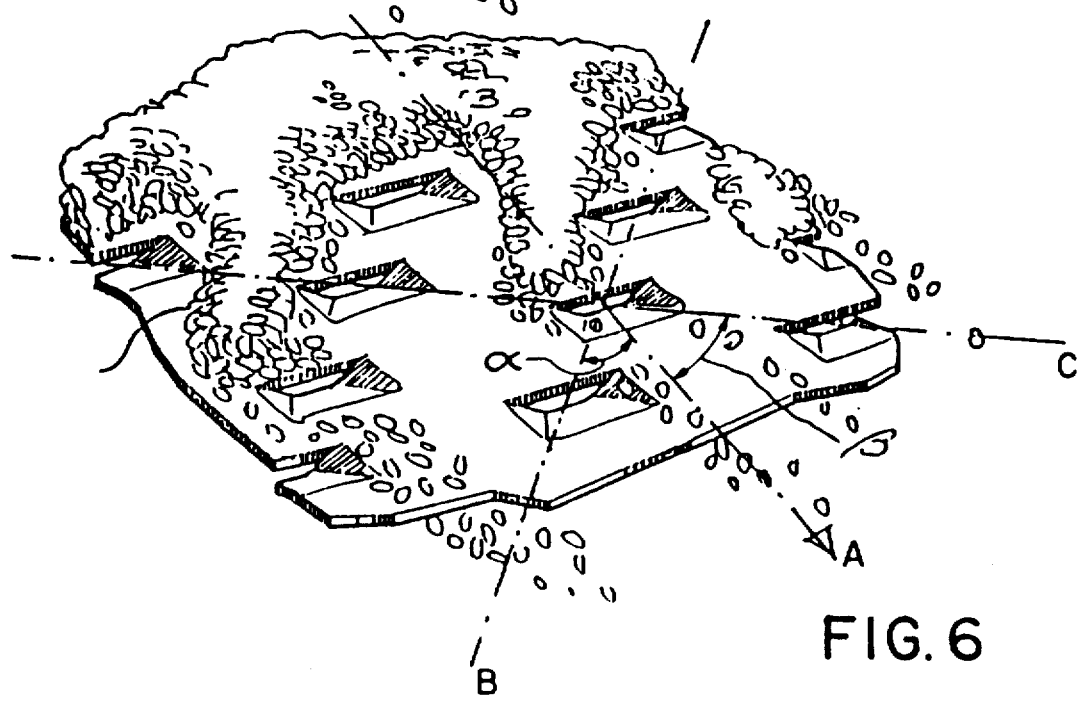

Illustrated in FIGS. 4-6 are three different stages after the air flow has been switched on in order to feed out the cereal grain. FIG. 4 shows the initial phase, when the extreme front edge of the cereal grain lies essentially symmetrically in relation to a row of slots running transversely across the direction of transport. A certain quantity of cereal grain is shown to have been removed in FIG. 5, so that corresponding slots in a following row are exposed, and FIG. 6 shows an even later stage, when a further two rows of slots have been exposed. In this case largely all the cereal grain has been transported away from the vicinity of the two front rows of slots, whilst the leading edge of the cereal grain has formed diagonal arms 12 to the rear of the rows of slots B extending along the diagonal line B.

The invention is not restricted to the embodiment described above only by way of example, but can be modified in detailed aspects within the scope of the following Patent Claims, without in so doing departing from the idea of invention. The invention is thus not restricted to use in conjunction with the handling of cereal grain, and every type of goods in bulk which is easy to move can conceivably be handled with the invention.

I claim:

1. Arrangement for the transport of goods in bulk, such as cereal grain, by means of air flowing through a perforated base plate, comprising a base plate provided with a plurality of stamped areas defining funnel-shaped depressions disposed transversely across said base plate, some of said depressions being laterally displaced in relation to some depressions in front and behind other depressions in an unsymmetrical manner, such that they form diagonal rows with respect to the flow path of the goods along said base plate, one diagonal row defining an angle $\alpha$ with respect to said flow path, said angle $\alpha$ being considerably smaller in relation to an angle $\beta$ defined by another diagonal row with respect to said flow path, wherein diagonal lines which represent the angles $\alpha$ and $\beta$ are drawn through corresponding depressions on either side of a central line in transverse rows of depressions immediately before and after a transverse row having the depression through which the central line is drawn counted in the direction of the flow path.

2. Arrangement in accordance with claim 1, wherein, in the case of one group of depressions, pairs of other depressions are situated to either side in the direction of the flow path, each pair of which consists of one depression situated in front of, and one depression situated in the rear of said group of depressions in which the front depression of one of the pairs of slots and the rear slot of the other pair of depressions, when measured across the direction of the flow path, lie slightly overlapping, whereas the other depressions in each of the two pairs of slots, measured in the same direction, are situated at a considerable distance from said group of depressions.

3. Arrangement in accordance with claim 1, wherein one group of depressions extends along lines running transversely to the direction of the flow path.

4. Arrangement in accordance with claim 2, characterized in that the depressions extend along lines running transversely to the direction of transport.

5. Arrangement in accordance with claim 1, wherein, in the case of one group of depressions, pairs of other depressions are situated to either side in the direction of the flow path, each pair of which consists of one depression situated in front of, and one depression situated in the rear of said group of depressions in which the front depression of one of the pairs of slots and the rear slot of the other pair of depressions, when measured across the direction of the flow path, are at least displaced by a small lateral distance from either end of the group of depressions, whereas the other depressions in each of the two pairs of slots, measured in the same direction, are situated at a considerable distance from said group of depressions.

* * * * *